United States Patent [19]

Daniels et al.

[11] Patent Number: 4,631,813
[45] Date of Patent: Dec. 30, 1986

[54] APPARATUS FOR ASSEMBLING HEAT EXCHANGERS

[75] Inventors: Manfred Daniels, Solingen; Helmut Trimborn, Langenfeld, both of Fed. Rep. of Germany

[73] Assignee: Th. Kieserling & Albrecht GmbH and Co., Solingen, Fed. Rep. of Germany

[21] Appl. No.: 767,501

[22] Filed: Aug. 20, 1985

[30] Foreign Application Priority Data

Aug. 23, 1984 [DE] Fed. Rep. of Germany ....... 3430964

[51] Int. Cl.$^4$ ...................... B23P 15/26; B23P 19/00; B21D 39/08
[52] U.S. Cl. .................................. 29/727; 29/33 P; 29/33 T; 29/429; 29/430; 29/791; 29/795; 29/824
[58] Field of Search ................. 29/33 P, 33 T, 430, 29/429, 726, 727, 791, 795, 822, 823, 824; 414/746

[56] References Cited

U.S. PATENT DOCUMENTS

| | | | |
|---|---|---|---|
| 2,371,906 | 3/1945 | Millholland | 29/33 P |
| 2,489,889 | 11/1949 | Huber | 29/726 |
| 3,683,481 | 8/1972 | Blackburn | 29/727 X |
| 3,688,533 | 9/1972 | Ames | 29/727 X |

Primary Examiner—Howard N. Goldberg
Assistant Examiner—R. S. Wallace

[57] ABSTRACT

Apparatus for assembling plate and tube heat exchangers of the type having tube end portions joined to end plates includes a carriage for longitudinally carrying an assembled but unjoined heat exchanger. An upright stationary frame supports a tool holder for movement transversely of the heat exchanger longitudinal axis. The tool holder is movable so that tools carried thereby are located in facing relationship to an end plate for joining tube end portions thereto. The tool holder is also transversely movable to a clearance position for providing longitudinal movement of the heat exchanger and carriage therepast. A clamping device at the opposite end portion of the heat exchanger clamps the opposite tube end portions for holding the tubes against longitudinal and rotational movement while the other tube end portions are joined to an end plate. The clamping device is also movable transversely of the heat exchanger longitudinal axis. The tool holder is also movable between a pair of opposite working positions in which the tools carried by the tool holder face in opposite directions.

15 Claims, 4 Drawing Figures

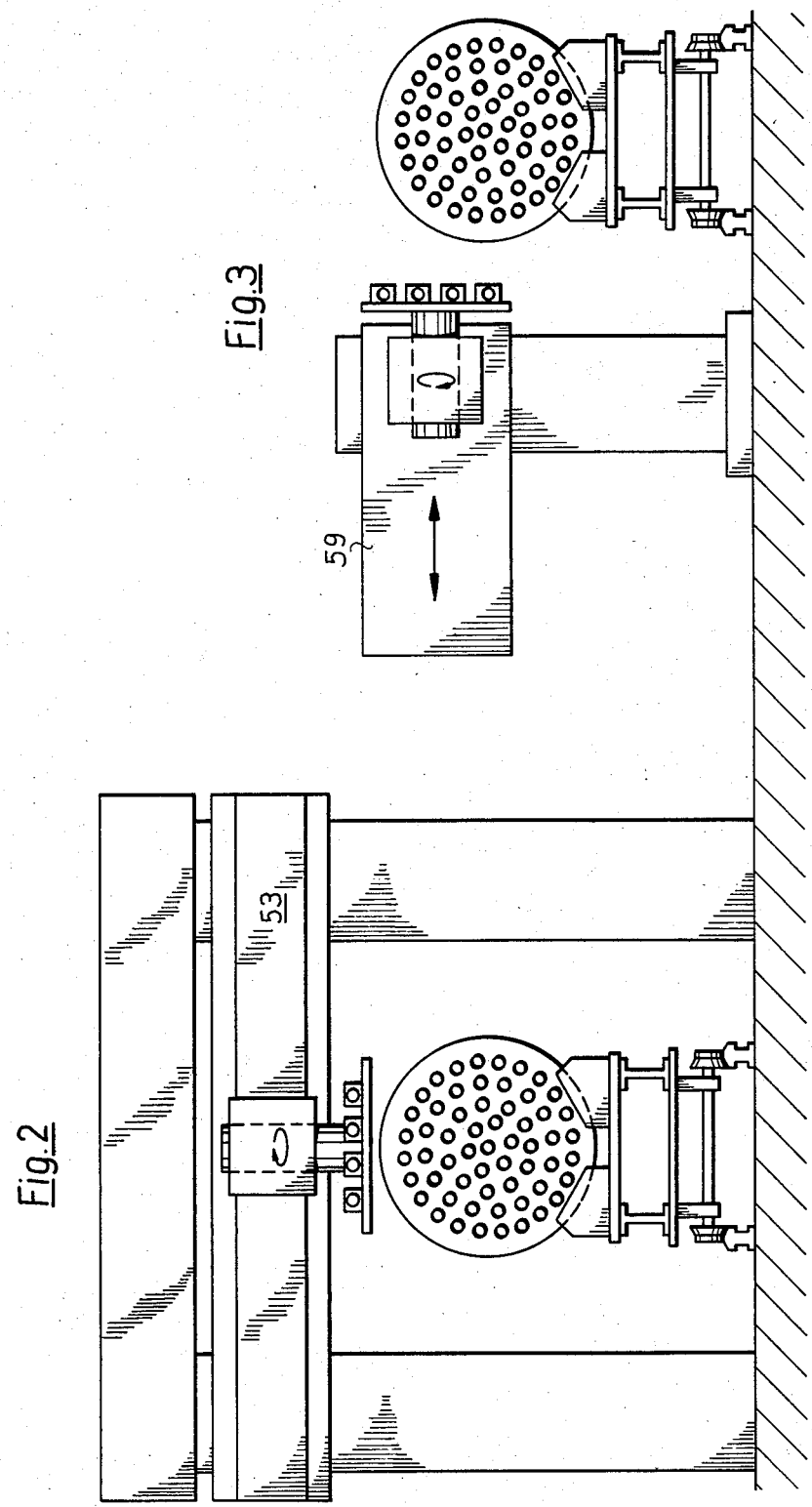

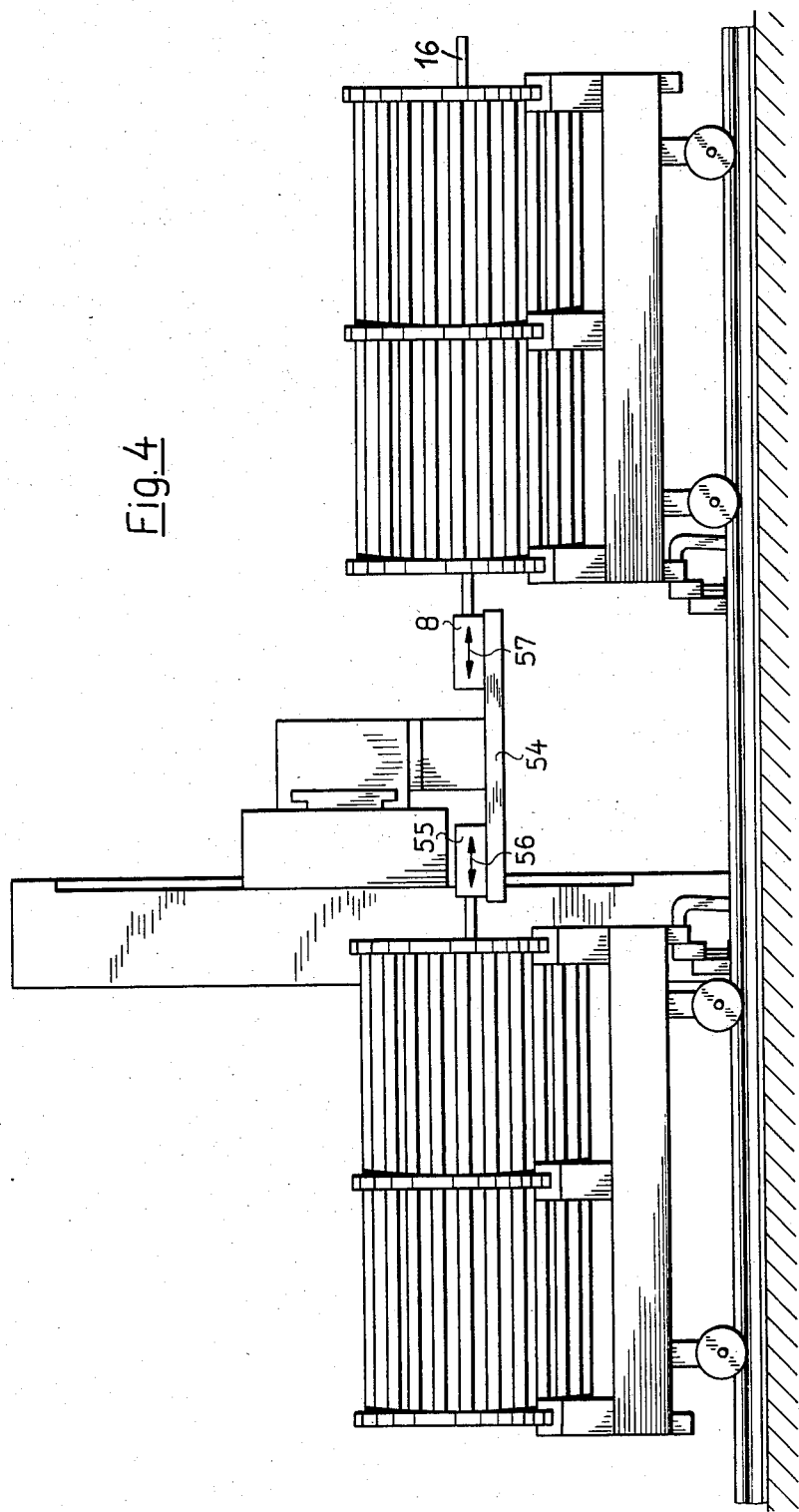

4,631,813

APPARATUS FOR ASSEMBLING HEAT EXCHANGERS

BACKGROUND OF THE INVENTION

This application relates to the art of assembly apparatus and, more particularly, to apparatus for assembling plate and tube-type of heat exchangers. However, it will be recognized that many features of the apparatus constructed in accordance with the present application can be used in other types of assembly apparatus.

Heat exchangers of a known type include a plurality of spaced-apart parallel tubes having opposite end portions extending through holes in end plates and being joined to such end plates. One or more intermediate plates may be provided for holding the tubes in parallel spaced-apart relationship but without the tubes being permanently joined to such intermediate plates.

Prior to joining of the tube end portions to the end plates, a number of preliminary work steps are necessary, such as positioning, milling and expanding. The tube end portions are then welded to the end plates and the pipe end portions are rolled into the end plate. Apparatus required for the welding and rolling operations is known to those skilled in the art. However, joining of the tube end portions to the end plates is primarily carried out manually and this is very expensive when considering that heat exchangers commonly have hundreds of tubes.

Heat exchangers of the type described can be around ten meters in length and it has been believed that an automatic assembly machine for joining both end portions of the tubes to the end plates would have to be of enormous size. Also, an apparatus with a pair of spaced-apart work stations at a fixed distance from one another would be impractical because heat exchangers of the type described are manufactured to a great variety of lengths.

It would be desirable to have an economical apparatus for use in joining tube end portions to end plates in the manufacture of tube and plate heat exchangers.

SUMMARY OF THE INVENTION

In accordance with the present application, tools carried by a tool holder on a stationary upright support frame are selectively movable for joining both of the opposite end portions of the tubes to the opposite end plates of a tube and plate heat exchanger.

More specifically, the apparatus of the present application includes carriage means for longitudinally carrying an assembled tube and plate heat exchanger in which the tube end portions are not yet permanently joined to the end plates. A stationary upright frame supports tool holder means for holding tools used in joining the tube end portions to the end plates. Holding means is provided for holding the carriage against movement with one end plate of the heat exchanger located adjacent the tools carried by the tool holder.

The tool holder is movable vertically and horizontally transversely of the heat exchanger longitudinal axis, and is also movable parallel to such axis. All of these movexents can take place while the tools are in facing relationship to an end plate for joining the tube end portions thereto. The tool holder is also movable transversely to a clearance position in which the heat exchanger and carriage can move longitudinally therepast.

Clamping means is provided for clamping the trailing end portions of the tubes to prevent longitudinal and rotational movement of the tubes while the leading end portions thereof are being joined to an end plate. The clamping means is also movable transversely of the heat exchanger longitudinal axis and is also movable to a clearance position for allowing movement of the heat exchanger and carriage therepast. The clamping means is supported by an upright frame which is movable toward and away from the tool holder support frame so that the apparatus can accommodate heat exchangers of various lengths.

In operation of the apparatus, an assembled but unjoined heat exchanger is moved longitudinally on a carriage past the clamping station toward the tool holder station where the carriage is held by the holding means. The clamping means is manipulated for holding the trailing end portions of the tubes while the tool holder means is manipulated for use of the tools carried thereby to join the leading end portions of the tubes to the lead end plate. The tool holder means is then moved transversely to its clearance position for longitudinal movement of the carriage and heat exchanger therepast. When the trailing end plate and the trailing tube end portions have moved past the tool holder means, the carriage is again held against movement by a holding means so that the same tools which joined the leading end portions of the tubes to the leading end plate can be used for joining the trailing end portions of the tubes to the trailing end plate Thus, the same tools and the same tool station may be used for joining the leading and trailing end portions of the tubes to the leading and trailing end plates.

The tool holder means may be movable between opposite working positions in which the tools carried thereby face in opposite directions so that they can be used for joining both the leading and trailing end portions of the tubes to the leading and trailing end plates. However, it will be recognized that the tool holder means at the joining station may carry separate tools or tool sets, with one set being used for joining the leading end portions of tubes to leading end plates, while the other tool set is used for joining trailing tube end portions to trailing end plates. The tools carried by the tool holder means are used for performing such operations as milling, expanding, welding and rolling. Obviously, any desired number of known tools for performing known operations can be carried by the tool holder means. When the tool holder means carries two sets of tools, it is possible to simultaneously join the trailing tube end portions to a trailing end plate of one heat exchanger while the leading tube end portions of another heat exchanger are being joined to its leading end plate.

It is a principal object of the present invention to provide an apparatus for joining tube end portions to end plates in a tube and plate heat exchanger.

It is also an object of the invention to provide an apparatus of the type described which is very economical to manufacture and use.

It is a further object of the invention to provide an apparatus of the type described which simplifies the manufacture of tube and plate-type of heat exchangers.

BRIEF DESCRIPTION OF THE DRAWINGS

FIG. 2 is an end elevational view of one form of support frame for an apparatus constructed in accordance with the present application;

FIG. 3 is an end elevational view of another form of apparatus constructed in accordance with the present application; and FIG. 4 is a side elevational view of an apparatus having a tool holder with a duplicate set of tools for simultaneous operation on two different heat exchangers.

DESCRIPTION OF PREFERRED EMBODIMENTS

Figure 1:
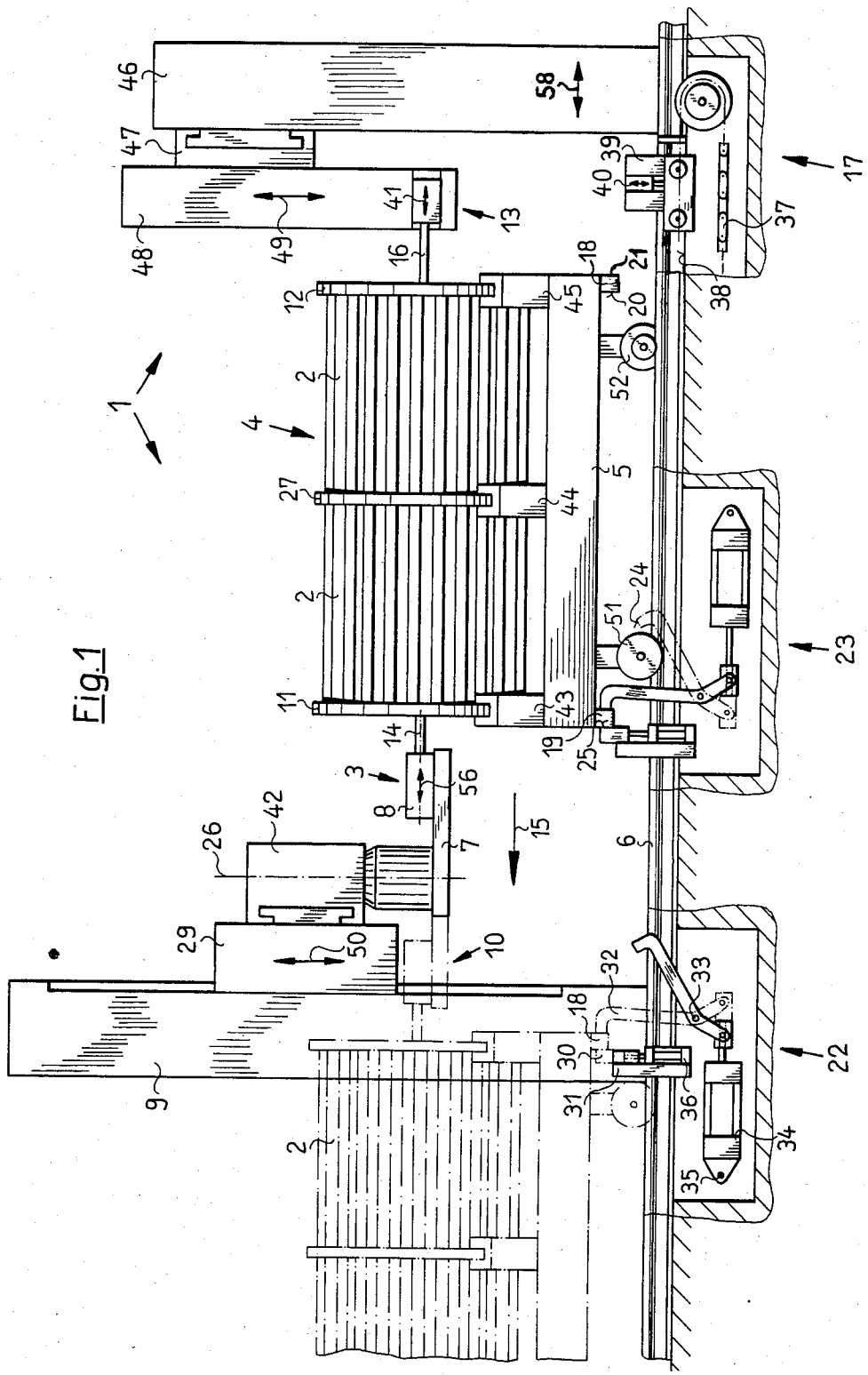
FIG. 1 is a side elevational view of an apparatus constructed in accordance with the present application.

Referring now to the drawing, wherein the showings are for purposes of illustrating preferred embodiments of the invention only and not for purposes of limiting same, FIG. 1 shows an apparatus 1 constructed in accordance with the present invention as including a stationary upright tool holder support frame 9 and an upright support frame 46 for a clamping device 13. A carriage 5 rolls on rails 6 and carries an assembled but unjoined plate and tube heat exchanger 4.

A traverse 29 is mounted on the support frame 9 for vertical movement relative thereto as indicated by arrows 50. A support member 42 is mounted on the traverse 29 for horizontal movement relative thereto perpendicular to the plane of the paper in FIG. 1. Tool holder means 7 is supported by the support 42 for selective rotational movement about a vertical axis 26. In a preferred arrangement, the tool holder means 7 can be rotated 180° between a pair of opposite working positions generally indicated by numerals 3,10. A plurality of tools 8 are carried by the tool holder means 7 for selective movement parallel to the longitudinal axis of the heat exchanger 4 as indicated by arrows 56. This movement is also substantially parallel to the longitudinal axis 14 of the tools. Many different types of tools 8 can be supported by the tool holder means 7. By way of example, the tools 8 may include milling, expanding, welding and rolling tools. The tool holder means 7 can be moved across the entire end face of an end plate for joining all of the tubes to an end plate. The tool holder means 7 can also be moved transversely of the heat exchanger longitudinal axis to a clearance position for allowing longitudinal movement of the heat exchanger 4 and the carriage 5 therepast as indicated by arrow 15.

The heat exchanger 4 includes a plurality of tubes 2 having end portions to be joined to leading and trailing end plates 11,12. An intermediate support plate is indicated at 27 for holding the tubes 2 in parallel spaced-apart relationship. The leading and trailing end plates 11,12 have a plurality of spaced-apart holes therethrough for receiving the end portions of the tubes 2. The heat exchanger 4 is assembled with the tube end portions being unjoined to the end plates 11,12. Plate supports 43, 44 and 45 are securely attached to the carriage 5 for supporting the plates 11, 27 and 12. This helps to hold the relatively unstable heat exchanger in position as it is transported and during the joining operations. The carriage 5 has wheels 51, 52 which roll on the rails 6 for moving the heat exchanger 4 in the direction of the arrow 15 parallel to the heat exchanger longitudinal axis.

A traction device 17 for moving the carriage 5 includes a chain to which a carrier 39 is attached for movement along a guideway 38. The carrier 39 is vertically movable as indicated by arrows 40 between a lower position in which it can pass beneath a carriage 5 and an upper position in which it engages a carriage 5.

The carriage 5 has stop means 18, 19 on the underside thereof adjacent the carriage ends. Each stop means 18, 19 has a pair of oppositely facing stop surfaces 20, 21 which face outwardly parallel to the direction 15 of carriage movement. When the carrier 39 is moved to its upper position, it engages the surface 21 on the stop means 18 for pushing the carriage 5 in the direction of the arrow 15.

Carriage holding means 22, 23 are provided for holding the carriage 5 against movement while the pipe end portions are joined to an end plate. Each holding means 22, 23 includes a stationary support 31 over which the stop means 18, 19 can freely pass. A stop member 30 is mounted on the support 31 and is vertically movable as by operation of a fluid cylinder 36. The stop member 30 is movable to an upper position in which its stop surface 25 will engage the stop surface 20 on a stop means 18 or 19. The stop member 30 is movable to a lower position in which the stop means 18, 19 can freely move therepast. When a stop means 18, 19 engages a stop member 30, a holding lever 32 swingable upwardly and downwardly about a hinge point 33 moves upwardly until its end 24 engages the stop surface 21 on a stop means 18 or 19 in opposition to the stop member 30. This securely holds the carriage 5 against movement on the rails 6 while joining operations take place. Movement of the lever 32 is by operation of a fluid cylinder 34 supported at 35. When it is desired to again move the carriage 5 and the heat exchanger 4 carried thereby, the stop member 30 and the lever 32 are lowered while the carrier 39 is moved upwardly so the traction device 17 can push the carriage 5 to a new position or completely away from the apparatus 1.

The tool holder means 7 and the tools 8 are shown in a working position in facing relationship to the leading end plate 11. The trailing end portions of the tubes 2 at the trailing end plate 12 are gripped by a clamping means 13 for holding the tubes 2 against longitudinal and rotational movement during the joining operation. Clamping tools 16 are capable of movement horizontally parallel to the longitudinal axis of the heat exchanger 4 as indicated by the arrows 41. Control means is provided to insure that the same tube whose leading end portion is being worked on by the tools 8 is also gripped by the clamping tools 16 at its trailing end portion.

The clamping means 13 is mounted on the upright support frame 46 on which a traverse 47 is mounted for horizontal movement perpendicular to the plane of the paper. A support 48 is mounted on the traverse 47 for vertical movement as indicated by arrows 49. The frame 46 is also horizontally movable as indicated by arrows 58 toward and away from the frame 9 and parallel to the direction of movement of the carriage 5 for varying the distance between the frames 9, 46 to accommodate heat exchangers of different lengths. The clamping means 13 is capable of transverse movement throughout the entire end face of the trailing end plate 12 and is also transversely movable to a clearance position outwardly of the carriage 5 and heat exchanger 4 so that a new heat exchanger can move therepast from right-to-left in FIG. 1. The clamping means 13 is capable of the same movements as the tool holder means 7 except for swinging movement which is not necessary because the clamping tools 16 are needed only to hold the unjoined trailing end portions of the tubes while the leading tube end portions are joined to the leading end plate. Clamping of the tubes is not necessary for joining the trailing end portions of the tubes to the trailing end plate because the leading tube end portions are already fixed to the leading end plate.

FIG. 2 shows the upright stationary frame for supporting the tool holder means as being in the form of a portal with stationary upright frame members on opposite sides of the carriage rails and a fixed horizontal frame member at the upper ends of the vertical frame members spanning the rails. A traverse frame member 53 is supported for vertical movement on the upright frame members and carries the tool holder means. This type of construction has great rigidity and is a preferred arrangement. However, many other arrangements are possible such as the arrangement in FIG. 3 wherein the traverse frame member 59 is horizontally movable on an upright frame support located on only one side of the carriage rails. This traverse support member is generally cantilevered out from the upright frame. Regardless of the frame design, it is critical that the traverse frame member 29, 53, 59 be movable to a position in which the traverse frame member and the tool holder means carried thereby are spaced outwardly of the carriage and heat exchanger as shown in FIGS. 2 and 3 so that the carriage and heat exchanger can freely move longitudinally past the frame, traverse and tool holder means.

FIG. 4 shows a tool holder means 54 which is not swingable about a vertical axis between opposite working positions and instead carries two identical tool sets 8, 55 which face outwardly in opposite directions. Each tool set is movable as indicated by arrows 56, 57 parallel to the longitudinal axis of the heat exchanger. Each tool of the tool set is movable independently of the other for performing the necessary operations. With the arrangement of FIG. 4, when two heat exchangers are properly positioned, it is possible to simultaneously join the trailing end portions of tubes to a trailing end plate while the leading end portions of tubes in another heat exchanger are being joined to a leading end plate.

In operation of the apparatus, the clamping means 13 and clamping tools 16 are transversely moved out of the path 15 of a heat exchanger 4 and carriage 5. An assembled but unjoined heat exchanger and carriage are moved to the vicinity of the apparatus 1 past the clamping means support frame 46 until the traction means 17 can take over. The carriage 5 and heat exchanger 4 are then longitudinally moved to a position between frames 9, 46 and between the tools 8 and clamping tools 16. The holding means 23 is operated for stopping the carriage 5 in a proper position at the joining station while the carrier 39 is lowered. The holding lever 32 then swings upwardly for holding the carriage 5 and the heat exchanger 4 carried thereby against longitudinal movement at the joining station. The joining tools 8 and clamping tools 16 are then adjusted in accordance with the hole pattern in the end plates 11, 12. Only one leading tube end portion or a very small number of same are welded to the leading end plate 11 at the same time. The clamping tools 16 are operated for clamping the trailing end portions of the same tubes being worked on by the joining tools. This process is repeated until all of the leading tube end portions are joined to the leading end plate 11. The joining tools 8, tool holder means 7 and traverse 29 are then moved transversely outwardly beyond the end profile of the carriage 5 and heat exchanger 4 so that the heat exchanger 4 and carriage 5 can move longitudinally therepast. The holding means 23 is then released while the carrier 39 is raised so the traction means 17 can push the carrier 5 in the direction of the arrow 15 to the shadow line position indicated at the left of FIG. 1. The carriage 5 and heat exchanger 4 move to the left in FIG. 1 past the stationary support frame 9 and the tool holder means 7.

The holding means 22 is then operated by cooperation of the stop member 30 and stop lever 32 with the carriage stop means 18 for holding the carriage 5 in the shadow line position. The tool holder means 7 is then rotated about the vertical axis 26 180° to the shadow line position 10 so that the joining tools 8 are at an opposite working position for joining the trailing end portions of the tubes to the trailing end plate 12.

During the joining operations on a trailing end portion of a heat exchanger shown in shadow lines at the left of FIG. 1, a new assembled but unjoined heat exchanger is moved into position between the upright frames 9, 46. During the time that the trailing tube end portions are being joined to the trailing end plate of one heat exchanger, the hole pattern and position of the holes in the leading end plate of a new heat exchanger can be stored in the memory of a computerized control device so the joining tools will be ready to work on the leading tube end portions of the new heat exchanger. When all of the trailing tube end portions of the shadow line heat exchanger are joined to the trailing end plate, the tool holder means 7 is moved to its opposite position shown in solid lines in FIG. 1 for working on the leading end portions of the tubes in a new heat exchanger. The hole pattern and location of the holes stored in the memory of the control makes it possible to begin joining the leading tube end portions of a new heat exchanger to a leading end plate without delay.

When a duplicate pair of tool sets 8, 55 are used as shown in FIG. 4, the successive heat exchangers being assembled should have the same end pattern in the end plates and they should also be located at the same position. This makes it possible to simultaneously join trailing tube end portions to a trailing end plate on one heat exchanger while the leading tube end portions are being joined to a leading end plate on another heat exchanger.

The use of a known type of automatic control makes it possible to store the image of the holes in a pipe end plate. This makes it possible to automatically move the tool holder means for successively bringing the joining tools into proper position for joining all of the tube end portions to an end plate. A large number of individual tools can be included in the joining tools set 8 and each tool is individually controlled so that each tool can operate alone or in combination with other tools.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. Apparatus for joining tube end portions to end plates in a tube and plate heat exchanger comprising: carriage means for carrying an assembled but unjoined tube and plate heat exchanger, tool holder means for carrying tools for joining the tube end portions to the end plates of the heat exchanger carried by said carriage means, said tool holder means being movable transversely of and parallel to the longitudinal axis of the heat exchanger in facing relationship to an end plate, said tool holder means being movable transversely of the longitudinal axis of the heat exchanger to a clearance position outwardly of the heat exchanger for providing longitudinal movement of said carriage and a heat exchanger carried thereby past said tool holder means, and said tool holder means being movable between a pair of opposite working positions in which the tools carried thereby face in opposite directions.

2. The apparatus of claim 1 including clamping means for clamping the tubes against longitudinal and rotational movement at the end portions thereof opposite from the tube end portions being worked on by the tools carried by said tool holder means.

3. The apparatus of claim 2 wherein said clamping means is movable transversely of and parallel to the longitudinal axis of the heat exchanger and is movable transversely of such axis to a clearance position for providing movement therepast of said carriage means and a heat exchanger carried thereby.

4. The apparatus of claim 1 including holding means for holding said carriage means against movement.

5. The apparatus of claim 1 including stationary upright frame means on which said tool holder means is mounted.

6. The apparatus of claim 5 including rail means on which said carriage means is positioned, said frame means being a portal-type of frame spanning said rail means.

7. Apparatus for joining tube end portions to end plates of a plate and tube heat exchanger comprising: stationary upright frame means for supporting tool holder means, carriage means movable past said frame means for carrying an assembled but unjoined plate and tube heat exchanger, holding means for holding said carriage means against movement with the end plate of a heat exchanger carried thereby located adjacent said frame means, tool holder means mounted on said frame means for carrying tools operable for joining pipe ends to end plates, said tool holder means being movable vertically and horizontally transverse to the longitudinal axis of a heat exchanger carried by said carriage, and said tool holder means being movable to a clearance position for providing movement therepast of said carriage means and a heat exchanger carried thereby.

8. The apparatus of claim 7 wherein said tool holder means is movable between a pair of opposite working positions in which tools carried thereby face in opposite directions.

9. The apparatus of claim 8 wherein said tool holder means is rotatable about a vertical axis for movement between said pair of working positions.

10. The apparatus of claim 7 wherein said tool holder means carries two independent tool sets which face outwardly in opposite directions.

11. The apparatus of claim 7 wherein said holding means for holding said carriage against movement comprises stop means adjacent said frame means movable into and out of engagement with said carriage means.

12. The apparatus of claim 11 wherein said carriage means has oppositely facing stop surfaces on the underside thereof which face outwardly parallel to the direction of movement of said carriage means and said stop means is engageable with said stop surfaces.

13. The apparatus of claim 7 including clamping means spaced from said tool holder means parallel to the direction of movement of said carriage means for clamping end portions of tubes opposite from the end portions thereof being joined to an end plate by tools carried by said tool holder means to prevent longitudinal and rotational movement of the pipes.

14. The apparatus of claim 13 wherein said clamping means is movable vertically and horizontally transversely of the longitudinal axis of the heat exchanger and is movable to a clearance position for providing movement therepast of said carriage means and a heat exchanger carried thereby.

15. The apparatus of claim 13 including movable upright frame means for supporting said clamping means, said movable frame means being movable parallel to the direction of movement of said carriage means toward and away from said frame means on which said tool holder is supported.

* * * * *